US011908495B2

(12) United States Patent
Yang et al.

(10) Patent No.: US 11,908,495 B2
(45) Date of Patent: Feb. 20, 2024

(54) ELECTRONIC DEVICE WITH HEAT TRANSFER PEDESTAL HAVING OPTIMIZED INTERFACE SURFACE AND ASSOCIATED METHODS

(71) Applicant: Western Digital Technologies, Inc., San Jose, CA (US)

(72) Inventors: Bo Yang, Dublin, CA (US); Yuhang Yang, Milpitas, CA (US); Ning Ye, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/725,764

(22) Filed: Apr. 21, 2022

(65) Prior Publication Data
US 2023/0343370 A1 Oct. 26, 2023

(51) Int. Cl.
*G11B 33/14* (2006.01)
*G11B 33/12* (2006.01)

(52) U.S. Cl.
CPC ........ *G11B 33/1406* (2013.01); *G11B 33/124* (2013.01); *G11B 2220/2516* (2013.01)

(58) Field of Classification Search
None
See application file for complete search history.

(56) References Cited

U.S. PATENT DOCUMENTS

| 5,262,922 A | * | 11/1993 | Yamaji | H05K 1/0204 |
| | | | | 361/720 |
| 5,268,533 A | * | 12/1993 | Kovacs | H01L 23/562 |
| | | | | 174/546 |
| 5,424,913 A | * | 6/1995 | Swindler | G06F 1/203 |
| | | | | 361/679.55 |
| 5,777,844 A | * | 7/1998 | Kiefer | H05K 7/142 |
| | | | | 361/720 |

(Continued)

FOREIGN PATENT DOCUMENTS

| CN | 101794580 A | * | 8/2010 | ............. G11B 5/314 |
| JP | 2003101270 A | * | 4/2003 | |

(Continued)

OTHER PUBLICATIONS

Shashaank et al., Thermal Management of PCIe ADD in Card SSD, Proceedings of ARSSS International Conference, Apr. 29, 2018, pp. 6-10, Bengaluru, India.

*Primary Examiner* — William J Klimowicz
(74) *Attorney, Agent, or Firm* — Kunzler Bean & Adamson

(57) ABSTRACT

Disclosed herein is an electronic device that includes a pedestal that extends from a mounting surface of a base of the electronic device. The electronic device also includes a thermal interface material that is interposed between an interface surface of the pedestal and a data processing component, is in direct contact with the data processing component, and is in direct contact with a first portion and a second portion of the interface surface. The first portion of the interface surface of the pedestal has a first height, (Continued)

relative to the mounting surface of the base, and the second portion of the interface surface of the pedestal has a second height, relative to the mounting surface of the base and different than the first height.

20 Claims, 8 Drawing Sheets

(56) References Cited

U.S. PATENT DOCUMENTS

| | | | | |
|---|---|---|---|---|
| 6,243,262 | B1* | 6/2001 | Koo | G06F 1/184 |
| | | | | 361/752 |
| 6,320,723 | B1* | 11/2001 | Bernett | G11B 33/121 |
| | | | | 361/720 |
| 6,373,696 | B1 | 4/2002 | Bolognia et al. | |
| 6,454,572 | B1* | 9/2002 | Konetski | H01R 13/2435 |
| | | | | 439/74 |
| 6,695,042 | B1 | 2/2004 | Boudreaux et al. | |
| 7,365,938 | B2 | 4/2008 | Yong-Chul | |
| 7,518,859 | B2 | 4/2009 | Kobayashi et al. | |
| 8,018,689 | B2 | 9/2011 | Lee et al. | |
| 8,355,221 | B1 | 1/2013 | Cheglin et al. | |
| 8,363,351 | B1* | 1/2013 | Little | G11B 25/043 |
| | | | | 360/97.19 |
| 10,832,709 | B2* | 11/2020 | Mizuochi | G11B 5/3133 |
| 11,074,943 | B2* | 7/2021 | Tsoukatos | G06F 1/182 |
| 2002/0041023 | A1* | 4/2002 | Sakamoto | H01L 23/3135 |
| | | | | 257/E23.092 |
| 2004/0021988 | A1* | 2/2004 | Yamaoka | G11B 5/486 |
| 2005/0041326 | A1* | 2/2005 | Yoo | G11B 25/043 |
| | | | | 360/97.12 |
| 2005/0152118 | A1* | 7/2005 | Cho | G11B 33/123 |
| | | | | 257/E23.105 |
| 2006/0050430 | A1* | 3/2006 | Byun | G11B 33/08 |
| | | | | 360/99.15 |
| 2006/0050431 | A1* | 3/2006 | Byun | G11B 33/122 |
| 2007/0165385 | A1* | 7/2007 | Park | H05K 1/0204 |
| | | | | 361/748 |
| 2009/0213542 | A1* | 8/2009 | Freeman | G11B 5/4846 |
| | | | | 361/689 |
| 2010/0020503 | A1* | 1/2010 | Beaumier | H01L 23/04 |
| | | | | 438/118 |
| 2020/0243109 | A1* | 7/2020 | Mizuochi | G11B 5/3133 |
| 2021/0111093 | A1* | 4/2021 | Sinha | H01L 23/10 |
| 2021/0287721 | A1* | 9/2021 | Toukairin | H05K 5/04 |
| 2021/0384099 | A1 | 12/2021 | Yang et al. | |

FOREIGN PATENT DOCUMENTS

| | | | | | |
|---|---|---|---|---|---|
| JP | | 2004014032 A | * | 1/2004 | G11B 33/122 |
| JP | | 2021144769 A | * | 9/2021 | G11B 33/122 |

* cited by examiner

ELECTRONIC DEVICE WITH HEAT TRANSFER PEDESTAL HAVING OPTIMIZED INTERFACE SURFACE AND ASSOCIATED METHODS

FIELD

This disclosure relates generally to electronic devices, and more particularly to promoting heat transfer from a data processing component of an electronic device to a pedestal of the electronic device via a thermal interface material.

BACKGROUND

Some electronic devices include a data processing component, such as an integrated circuit or system-on-chip component. Data processing components generate heat that should be conducted away from the data processing components to avoid overheating of the data processing components. One thermally conductive pathway, through which heat can be conducted away from a data processing component, includes a thermal interface material and an enclosure of the electronic device. The thermal interface material is helpful to bridge a gap between the data processing component and the enclosure. In other words, heat generated by the data processing component is transferred to the enclosure via the thermal interface material. From the enclosure, the heat can be dissipated to the surrounding environment via any of various means.

Some thermal interface materials, such as sheet thermal interface materials, require compression to effectively transfer heat therethrough. However, proper compression of thermal interface materials can be difficult.

SUMMARY

The subject matter of the present application has been developed in response to the present state of the art, and, in particular, in response to the problems and needs of conventional electronic devices to dissipate heat generated by data processing components. In view of the foregoing, the subject matter of the present application has been developed to provide an electronic device and corresponding methods, that overcome at least some of the shortcomings of the prior art.

Disclosed herein is an electronic device that comprises a base. The base comprises a mounting surface. The electronic device also comprises a substrate that is fixed to the base. The electronic device further comprises a data processing component that is attached to the substrate. The electronic device additionally comprises a pedestal that extends from the mounting surface of the base, is interposed between the base and the data processing component, and comprises an interface surface having a first portion and a second portion. The electronic device also comprises a thermal interface material that is interposed between the interface surface of the pedestal and the data processing component, is in direct contact with the data processing component, and is in direct contact with the first portion and the second portion of the interface surface of the pedestal. The first portion of the interface surface of the pedestal has a first height, relative to the mounting surface of the base, and the second portion of the interface surface of the pedestal has a second height, relative to the mounting surface of the base and different than the first height. The preceding subject matter of this paragraph characterizes example 1 of the present disclosure.

The interface surface is planar, such that the first portion and the second portion of the interface surface are co-planar. The preceding subject matter of this paragraph characterizes example 2 of the present disclosure, wherein example 2 also includes the subject matter according to example 1, above.

At least one of the first portion or the second portion of the interface surface is angled relative to the mounting surface. The preceding subject matter of this paragraph characterizes example 3 of the present disclosure, wherein example 3 also includes the subject matter according to any one of examples 1 or 2, above.

The thermal interface material is in direct contact with the interface surface over an entirety of the interface surface of the pedestal. The entirety of the interface surface of the pedestal is angled relative to the mounting surface. The preceding subject matter of this paragraph characterizes example 4 of the present disclosure, wherein example 4 also includes the subject matter according to any one of examples 1-3, above.

The substrate is fixed to the base such that the data processing component imparts a first compressive force on the thermal interface material and the interface surface imparts a second compressive force on the thermal interface material. The preceding subject matter of this paragraph characterizes example 5 of the present disclosure, wherein example 5 also includes the subject matter according to any one of examples 1-4, above.

The thermal interface material is a sheet thermal interface material. The preceding subject matter of this paragraph characterizes example 6 of the present disclosure, wherein example 6 also includes the subject matter according to any one of examples 1-5, above.

The electronic device further comprises a cover coupled with the base, such that the substrate is interposed between the cover and the pedestal. The preceding subject matter of this paragraph characterizes example 7 of the present disclosure, wherein example 7 also includes the subject matter according to any one of examples 1-6, above.

The substrate is fixed to the base such that, independent of the cover, the data processing component imparts a first compressive force on the thermal interface material and the interface surface of the pedestal imparts a second compressive force on the thermal interface material. The preceding subject matter of this paragraph characterizes example 8 of the present disclosure, wherein example 8 also includes the subject matter according to example 7, above.

The electronic device further comprises a fastener, passing through the substrate and engaged with the base such that the substrate is fastened directly to the base. The preceding subject matter of this paragraph characterizes example 9 of the present disclosure, wherein example 9 also includes the subject matter according to any one of examples 1-8, above.

The electronic device further comprises a cover coupled with the base. The preceding subject matter of this paragraph characterizes example 10 of the present disclosure, wherein example 10 also includes the subject matter according to any one of examples 1-9, above.

The pedestal and the base together form a one-piece monolithic construction. The preceding subject matter of this paragraph characterizes example 11 of the present disclosure, wherein example 11 also includes the subject matter according to example 10, above.

The substrate is in direct contact with the base. The preceding subject matter of this paragraph characterizes example 12 of the present disclosure, wherein example 12 also includes the subject matter according to any one of examples 1-11, above.

The electronic device further comprises a second data processing component, attached to the substrate. The electronic device also comprises a second pedestal that extends from the mounting surface of the base, is interposed between the base and the second data processing component, and comprises a second-pedestal interface surface having a second-pedestal first portion and a second-pedestal second portion. The electronic device additionally comprises a second thermal interface material that is interposed between the second-pedestal interface surface and the second data processing component, is in direct contact with the second data processing component, and is in direct contact with the second-pedestal first portion and the second-pedestal second portion of the second-pedestal interface surface. The second-pedestal first portion of the second-pedestal interface surface has a second-pedestal first height, relative to the mounting surface of the base, and the second-pedestal second portion of the second-pedestal interface surface has a second-pedestal second height, relative to the mounting surface of the base and different than the second-pedestal first height. The first height of the first portion of the interface surface is a minimum height of the interface surface. The second height of the second portion of the interface surface is a maximum height of the interface surface. The second-pedestal first height is a minimum height of the second-pedestal interface surface. The second-pedestal second height is a maximum height of the second-pedestal interface surface. At least one of the first height of the interface surface is different than the second-pedestal first height, or the second height of the interface surface is different that the second-pedestal second height. The preceding subject matter of this paragraph characterizes example 13 of the present disclosure, wherein example 13 also includes the subject matter according to any one of examples 1-12, above.

The electronic device further comprises a second data processing component that is attached to the substrate. The electronic device also comprises a second pedestal that extends from the mounting surface of the base, is interposed between the base and the second data processing component, and comprises a second-pedestal interface surface having a second-pedestal first portion and a second-pedestal second portion. The electronic device additionally comprises a second thermal interface material that is interposed between the second-pedestal interface surface and the second data processing component, is in direct contact with the second data processing component, and is in direct contact with the second-pedestal first portion and the second-pedestal second portion of the second-pedestal interface surface. The second-pedestal first portion of the second-pedestal interface surface has a second-pedestal first height, relative to the mounting surface of the base, and the second-pedestal second portion of the second-pedestal interface surface has a second-pedestal second height, relative to the mounting surface of the base and different than the second-pedestal first height. The thermal interface material is in direct contact with the interface surface over an entirety of the interface surface of the pedestal. The second thermal interface material is in direct contact with the second-pedestal interface surface over an entirety of the second-pedestal interface surface. The entirety of the interface surface of the pedestal is angled, at a first angle, relative to the mounting surface. The entirety of the second-pedestal interface surface of the second pedestal is angled, at a second angle, relative to the mounting surface. The first angle is different than the second angle. The preceding subject matter of this paragraph characterizes example 14 of the present disclosure, wherein example 14 also includes the subject matter according to any one of examples 1-13, above.

Further disclosed herein is a data storage device that comprises an enclosure. The enclosure comprises a base having a mounting surface, a cover coupled to the base, and an interior cavity defined between the base and the cover. The data storage device also comprises a substrate that is fixed to the base within the interior cavity. The data storage device further comprises a data processing component that is attached to the substrate. The data storage device additionally comprises a data storage component that is within the interior cavity and is unattached to the substrate. The data storage device also comprises a pedestal that extends from the mounting surface of the base, is interposed between the base and the data processing component, and comprises an interface surface having a first portion and a second portion. The data storage device further comprises a thermal interface material that is interposed between the interface surface of the pedestal and the data processing component, is in direct contact with the data processing component, and is in direct contact with the first portion and the second portion of the interface surface of the pedestal. The first portion of the interface surface of the pedestal has a first height, relative to the mounting surface of the base, and the second portion of the interface surface of the pedestal has a second height, relative to the mounting surface of the base and different than the first height. The preceding subject matter of this paragraph characterizes example 15 of the present disclosure.

The substrate comprises a printed circuit board. The data processing component comprises a semiconductor integrated circuit attached to the printed circuit board by a plurality of solder connections. The preceding subject matter of this paragraph characterizes example 16 of the present disclosure, wherein example 16 also includes the subject matter according to example 15, above.

The data storage component comprises a magnetic storage disk. The preceding subject matter of this paragraph characterizes example 17 of the present disclosure, wherein example 17 also includes the subject matter according to any one of examples 15 or 16, above.

The base further comprises a receptacle extending from the mounting surface. The substrate comprises an opening. The data storage device further comprises a fastener that passes through the opening of the substrate and is engaged with the receptacle of the base, such that the substrate is fastened directly to the base. Engagement between the fastener and the receptacle of the base generates a first compressive force from the data processing component to the thermal interface material and a second compressive force from the interface surface of the pedestal to the thermal interface material. The preceding subject matter of this paragraph characterizes example 18 of the present disclosure, wherein example 18 also includes the subject matter according to any one of examples 15-17, above.

The receptacle defines a central axis. The fastener is coaxial with the central axis. The interface surface of the pedestal is oblique relative to central axis of the receptacle. The preceding subject matter of this paragraph characterizes example 19 of the present disclosure, wherein example 19 also includes the subject matter according to example 18, above.

Additionally disclosed herein is a method of making an electronic device. The electronic device comprises a base, a substrate fixed to the base, a data processing component attached to the substrate, a pedestal extending from a mounting surface of the base, and a thermal interface material interposed between, and in contact with, an interface surface of the pedestal and the data processing component. The method comprises a step of creating a digital three-dimensional (3D) model of a first design of the electronic device. In the first design of the electronic device, a first portion of the interface surface of the pedestal has a first height, relative to the mounting surface, and a second portion of the interface surface of the pedestal has a second height, relative to the mounting surface, that is different than the first height. The method also comprises a step of simulating compression of the thermal interface material of the 3D model of the first design of the electronic device. The method further comprises a step of, if simulated compression of the thermal interface material is within a predetermined range, manufacturing the pedestal of the electronic device such that the first portion of the interface surface of the pedestal has the first height and the second portion of the interface surface of the pedestal has the second height. The method additionally comprises a step of, if the simulated compression of the thermal interface material is outside the predetermined range, creating a 3D model of a second design of the electronic device. In the second design of the electronic device, the first portion of the interface surface of the pedestal has a third height, relative to the mounting surface, and the second portion of the interface surface of the pedestal has a fourth height, relative to the mounting surface, that is different than the third height. Either the third height is different than the first height or the fourth height is different than the second height. The preceding subject matter of this paragraph characterizes example 20 of the present disclosure.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended numbered paragraphs, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

The subject matter of the present disclosure includes an electronic device that has a pedestal with an interface surface configured to promote heat transfer away from a data processing component of the electronic device. A thermal interface material is positioned between the data processing component and the interface surface of the pedestal to facilitate heat transfer from the data processing component to the pedestal. In some examples, the thermal interface material is a sheet made of a material with a relatively high thermal conductivity. According to certain examples, the thermal interface material facilitates heat transfer when compressed between the data processing component and the interface surface of the pedestal. Uniform compression of the thermal interface material by the data processing component and the interface surface of the pedestal enhances the heat transfer properties of the thermal interface material. However, due to potentially uneven compressive forces acting on the data processing component, the compressive forces imparted to the thermal interface material by the data processing component can be non-uniform or below a minimum threshold. Therefore, in the present disclosure, the properties (e.g., angle, slope, tilt, curvature, etc.) of the interface surface of the pedestal are optimized (e.g., customized), in view of the compressive forces acting on the data processing component, to promote uniform compression of the thermal interface material by the data processing component.

Figure 1:
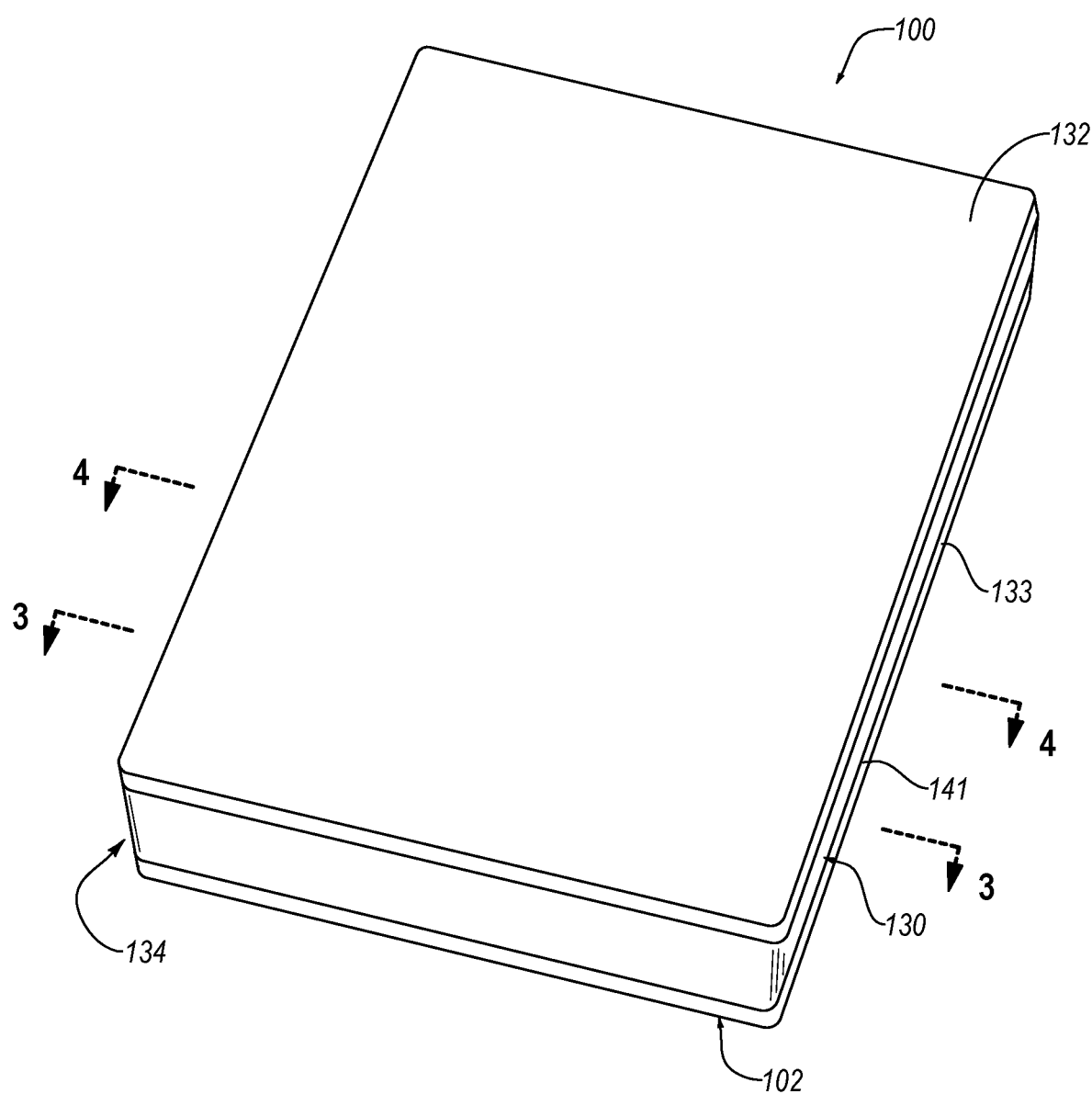
FIG. 1 is a perspective, schematic view of an electronic device, according to one or more examples of the present disclosure.

Referring to FIG. 1, an electronic device 100, according to one example, is shown. The electronic device 100 can be any of various electronic devices that include a data processing component 124 that generates heat. In the illustrated examples, the electronic device 100 is depicted as a hard disk drive (HDD) or other magnetic recording device. However, in other examples, the electronic device 100 is a non-magnetic data storage device, such as a solid-state drive (SSD). Alternatively, according to certain examples, the electronic device 100 is an electronic device that is not specifically configured to store data.

Generally, the electronic device 100 is any of various electronic devices that includes a base 134, a substrate 122, and a data processing component 124. In certain examples, the base 134 forms part of an enclosure 102 (e.g., housing) of the electronic device 100. The enclosure 102 defines an interior cavity 139 (see, e.g., FIGS. 2 and 3) of the electronic device 100 in which various components and features of the electronic device 100 are located. In some examples, the enclosure 102 seals or encloses the interior cavity 139. The enclosure 102 includes a base 134 and a cover 132. The cover 132 is coupled to the base 134 to enclose the interior cavity 139 from the environment exterior to the enclosure 102. In some examples, a seal or gasket is positioned between the base 134 and the cover 132 to promote a hermetic seal between the base 134 and the cover 132. In some examples, the seal between the base 134 and the cover 132 is sufficiently strong to retain, over time, the environmental conditions within the interior cavity 139 at the time the enclosure 102 is sealed. According to certain examples, the enclosure 102 also includes a second cover 133 that seals or encloses the interior cavity 139 from a second side of the base 134 that is opposite the side sealed or enclosed by the cover 132.

Figure 2:
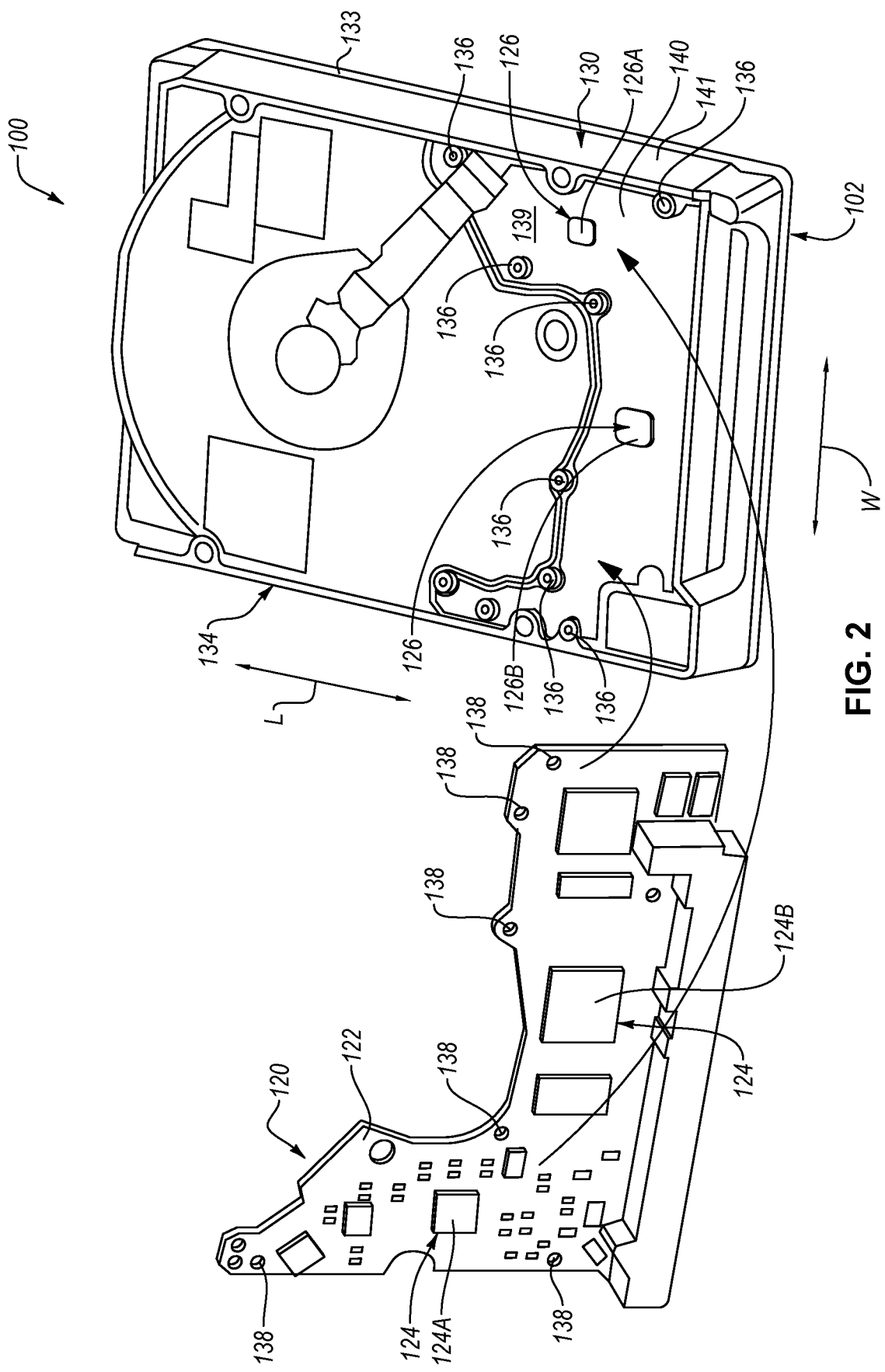
FIG. 2 is a perspective, exploded, schematic view of an electronic device, according to one or more examples of the present disclosure.
Figure 3:
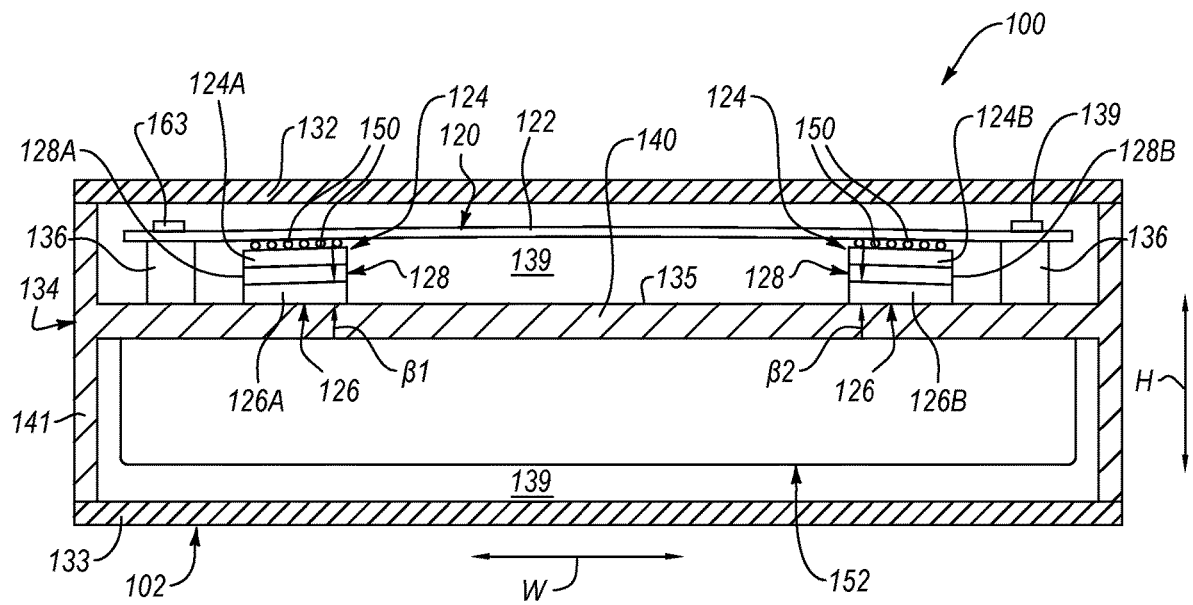
FIG. 3 is a front elevation, sectional, schematic view of the electronic device of FIG. 1, taken along line 3-3 of FIG. 1, according to one or more examples of the present disclosure.
Figure 4:
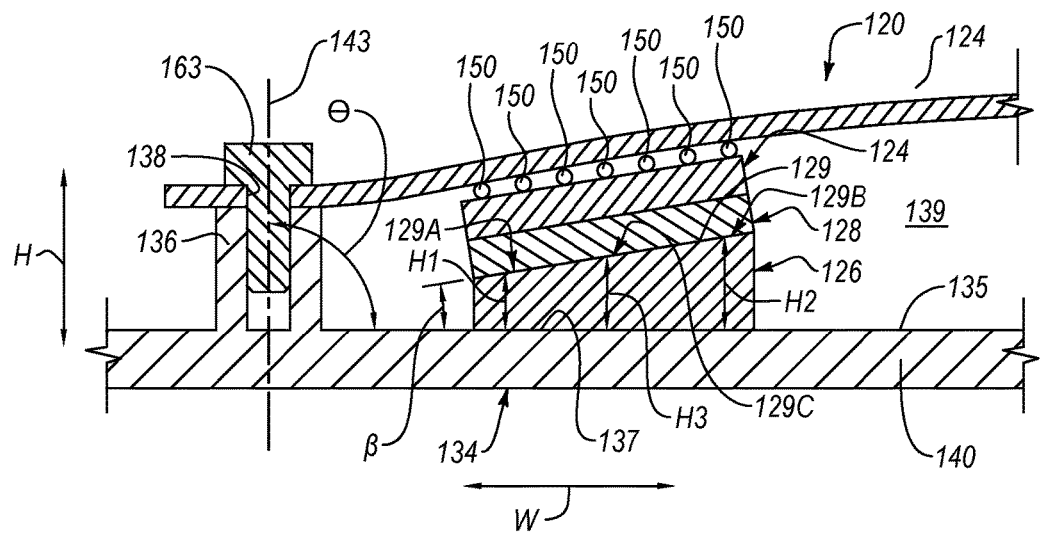
FIG. 4 is a front elevation, sectional, schematic view of a portion of the electronic device of FIG. 1, taken along line 4-4 of FIG. 1, according to one or more examples of the present disclosure.

Referring to FIGS. 2, 3, and 4, the base 134 includes a base plate 140 and sidewalls 141 extending perpendicularly away from the base plate 140. The base plate 140 further includes a mounting surface 135, which faces the cover 132, and a surface opposite the mounting surface 135, which faces the second cover 133. The sidewalls 141 define four sides of the enclosure 102 in some examples, such as with conventional rectangularly-shaped form factors. The cover 132 is attached to the sidewalls 141. Accordingly, the interior cavity 139 is defined as the space between the cover 132 and the base 134 (e.g., between the cover 132, the sidewalls 141, and mounting surface 135 of the base plate 140). When the enclosure 102 has the second cover 133, the interior cavity 139 further includes the space between the second cover 133 and the base 134 (e.g., between the second cover 133, the sidewalls 141, and base plate 140 of the base 134). Accordingly, the base plate 140 can be considered to divide the interior cavity 139 into two sections (see, e.g., FIG. 3). The cover 132 is a generally thin-walled, plate-like structure that has substantially the same outer peripherally shape as the base 134 in certain examples. In some examples, the enclosure 102, including the base 130 and the cover 132, is made of a rigid material, such as a metallic material.

Referring to FIGS. 2 and 3, the electronic device 100 includes various features located within the interior cavity 139 of the enclosure 102. In one example, the electronic device 100 includes a substrate assembly 120 within interior cavity 139. The substrate assembly 120 is fixed to the mounting surface 135 of the base plate 140 such that the substrate assembly 120 is interposed between the mounting surface 135 and the cover 132. Furthermore, the substrate assembly 120 is spaced apart from the cover 132 such that no portion of the substrate assembly 120 (at least no data processing components or data storage components of the substrate assembly) is in contact with the cover 132. The substrate assembly 120 includes a substrate 122 and at least one data processing component 124 attached to the substrate 122.

As illustrated, in one example, the substrate assembly 120 is a printed circuit board assembly, the substrate 122 is a printed circuit board, and the data processing component 124 is an integrated circuit, a system-on-chip component, a semiconductor device, or some other heat-generating component. The substrate assembly 120 can include multiple data processing components 124, such as a first data processing component 124A and a second data processing component 124B. The first data processing component 124A is different than the second data processing component 124B (e.g., the first data processing component 124A has one of a different size or performs a different function than the second data processing component 124B). The substrate assembly 120 can include other electronic components as necessary to enable functionality of the electronic device 100. In certain examples, the data processing component 124 is attached to the substrate 122 via one or more solder connections 150 (e.g., solder balls, or other surface mounted technology (SMT) based connections). The solder connections 150 not only facilitate a mechanical connection between the data processing component 124 and the substrate 122, but provide the electrical connection between the data processing component 124 and the substrate 122.

In some examples, the electronic device 100 includes additional features located within the interior cavity 139 of the enclosure 102. For example, when the electronic device 100 is a magnetic storage device, the electronic device 100 can include actuating components 152 coupled with the base plate 140 of the base 134 opposite the mounting surface 135. The actuating components 152 include actuatable components and corresponding actuators. In some examples, one of the actuatable components is a carriage and one of the actuators is a voice coil motor (VCM). Alternatively, or additionally, in certain examples, one of the actuatable components is a hub and disks, and one of the actuators is a spindle motor. Each one of the spindle motor and the VCM includes at least one magnet, made of neodymium or similar material, that facilitate operation of the spindle motor and the VCM, respectively. The carriage includes a head stack assembly that includes a plurality of carriage arms and at least one head-gimbal assembly (e.g., suspension) coupled to the distal tip of each carriage arm of the plurality of carriage arms. Each head-gimbal assembly includes a suspension assembly and a slider.

Each one of the disks may be any of various types of magnetic storage media. Generally, in one example, each disk includes a substrate and a magnetic material applied directly or indirectly onto the substrate. For example, the magnetic material of the disks may be conventional granular magnetic storage disks or wafers that have magnetic layer bits with multiple magnetic grains on each bit. In granular magnetic media, all of the bits are co-planar and the surface of the disk is substantially smooth and continuous. In one example, each bit has a magnetic dipole moment that can either have an in-plane (longitudinal) orientation or an out-of-plane (perpendicular) orientation.

The substrate assembly 120 is fixed to the base 134 by fixing the substrate 122 to the base 134. The base 134 includes receptacles 136 that are configured to receive a corresponding one of multiple fasteners 163 of the electronic device 100. In some examples, the receptacles 136 extend from the mounting surface 135 of the base 134 toward the cover 132. The receptacles 136 are co-formed or attached to the mounting surface 135 in some examples. In certain examples, the receptacles 136 include threaded bores that are configured to receive, in threaded engagement, threads of respective ones of the fasteners 163. Moreover, the substrate 122 includes openings 138 through which corresponding ones of the fasteners 163 are passable. The locations of the openings 138 correspond with the locations of the receptacles 136 such that when the substrate assembly 120 is located within the interior cavity 139, each one of the openings 138 is aligned with a corresponding one of the receptacles 136, and the substrate 122 is supported on the receptacles 136. Accordingly, the substrate 122 is in direct contact with the base 134. The substrate 122 is fixed to the base 134 by inserting the fasteners 163 through corresponding ones of the openings 138 in the substrate 122 and into the receptacles 136. Rotating (e.g., tightening) the fasteners 163 when threadably engaged with the receptacles 136, tightens the substrate 122 against the receptacles 136, via a head of the fasteners 163 clamping down on the substrate 122. Although not shown, in some examples, additional fasteners, such as washers, can be used to promote retention of the substrate 122 by the fasteners 163.

Figure 5:
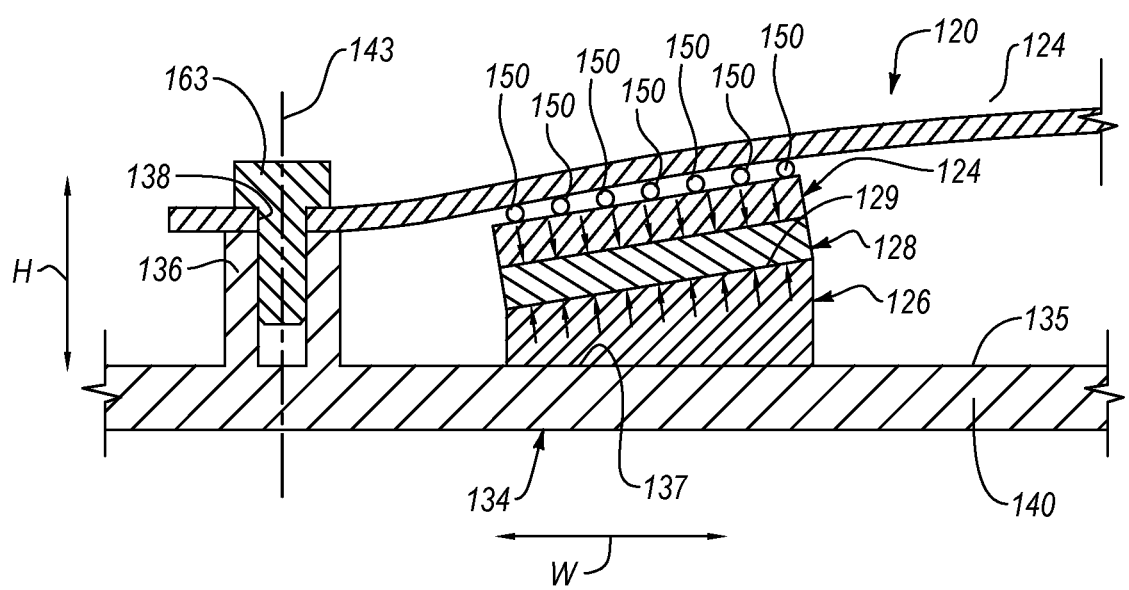
FIG. 5 is a front elevation, sectional, schematic view of a portion of the electronic device of FIG. 1, taken along line 4-4 of FIG. 1, according to one or more examples of the present disclosure.

Referring to FIGS. 4 and 5, in certain examples, the base 134, including the receptacles 136, is configured to mount the substrate 122 parallel to and spaced apart from the mounting surface 135 of the base 134. In other words, the substrate 122 is designed to be flat and planar, and mounted to the base 134 such that the substrate 122 is parallel to a plane 137 (see, e.g., FIGS. 4-10) that is co-planar with the mounting surface 135. Accordingly, in certain examples, the receptacles 136 are configured to define a central axis 143 that is perpendicular to the mounting surface 135, and thus the plane 137. In other words, in the illustrated example, an angle θ defined between the central axis 143 and the mounting surface 135 is 90°. When a fastener 163 is threadably engaged with a receptacle 136, a central axis of the fastener 163 (e.g., an axis of the shank of the fastener 163) is coaxial with the central axis 143 of the receptacle 136. Therefore, when the fastener 163 is tightened against the substrate 122, the substrate 122 is designed to be perpendicular to the central axis 143 of the receptacle 136 and parallel to the mounting surface 135 of the base plate 140.

To promote space for attachment of electrical components, including the data processing components 124, the openings 138 in the substrate 122 are positioned in a spaced apart manner along an outer periphery of the substrate 122. Accordingly, in some examples, the substrate 122 does not include openings 138 at central portions of the substrate 122 away from the outer periphery of the substrate 122.

As shown in FIG. 2, the electronic device 100 also includes at least one pedestal 126. The pedestal 126 extends from the mounting surface 135 of the base 134 towards the cover 132. Moreover, the pedestal 126 extends from the mounting surface 135 at a location such that the pedestal 126 is interposed between the base 134 (e.g. the base plate 140) and a data processing component 124. The pedestal 126 is co-formed (e.g., machined) with the base 134 in some examples, such that the pedestal 126 forms a one-piece seamless and monolithic construction with the base 134. However, in other examples, the pedestal 126 is formed separately from the base 134 and attached to the base 134.

In some examples, the electronic device 100 includes multiple pedestals 126 with each one of the pedestals corresponding positionally with one of multiple data processing components 124. As shown in FIG. 2, for example, the electronic device 100 includes a first pedestal 126A and a second pedestal 126B. The first pedestal 126A is positioned on the mounting surface 135 such that the first pedestal 126A is interposed between the base 134 and the first data processing component 124A. Similarly, the second pedestal 126B is positioned on the mounting surface 135 such that the second pedestal 126B is interposed between the base 134 and the second data processing component 124B.

Each one of the pedestals 126 is configured to promote heat transfer, via conduction, from a corresponding one of the data processing components 124 to the base 134 (e.g., the base plate 140 of the base 134). The heat from the base 134 is then dissipated to the surrounding environment, such as via cooling systems, heat exchangers, heat sinks, and the like. Accordingly, the pedestals 126 are configured to be in thermal engagement with corresponding ones of the data processing components 124.

To promote heat transfer, via conduction, from the data processing components 124 to the pedestal 126, the electronic device 100 further includes thermal interface materials 128 interposed between corresponding ones of the data processing components 124 and the pedestals 126. The thermal interface materials 128 are in direct contact with an interface surface 129 of the pedestal 126 and the data processing component 124 between which they are positioned. For example, as shown in FIG. 3, a first thermal interface material 128A is interposed between, and in direct contact with, the first data processing component 124A and the interface surface 129 of the first pedestal 126A, and a second thermal interface material 128B is interposed between, and in direct contact with, the interface surface 129 of the second data processing component 124B. Although the example of FIG. 3 shows two data processing components 124, two pedestals 126, and two thermal interface materials 128, in other examples, the electronic device 100 can include one set or more than two sets of data processing components 124, pedestals 126, and thermal interface materials 128.

Generally, the thermal interface materials 128 are configured to increase the surface-to-surface contact between the data processing components 124 and the thermal interface materials 128 and between the interface surfaces 129 of the pedestals 126 and the thermal interface materials 128, which provides a more efficient thermally conductive pathway between the data processing components 124 and the pedestals 126 than if the data processing components 124 and the pedestals 126 were in direct contact with each other. In other words, the thermal interface materials 128 help to fill gaps between the data processing components 124 and the interface surfaces 129 of the pedestals 126 to promote more efficient heat transfer, via conduction, between the data processing components 124 and the pedestals 126.

In some examples, the thermal interface material 128 is a sheet thermal interface material made of a material having a relatively high thermal conductivity. For example, the thermal interface material 128 can be made of a material having a higher thermal conductivity than the data processing components 124 and the pedestals 126. The thermal interface material 128 is made of a thermally conductive solid, non-flowable, and rigid material, such as copper, aluminum, graphite, silicone, graphite polymer, and the like. More specifically, the thermal interface material 128 of the electronic device 100 of the present disclosure is more rigid and less flowable than flowable thermal interface materials, such as liquids, greases, gels, putties, and pastes. Accordingly, the thermal interface material 128 is easier to handle and avoids oil-bleeding issues commonly associated with flowable thermal interface materials. But, because the thermal interface material 128 is non-flowable, compression of the thermal interface material 128 is needed to maintain effective thermal contact between the data processing components 124 and the pedestals 126.

The configuration (e.g., height) of the pedestals 126 is selected to promote compression of the thermal interface material 128 between the data processing components 124 and the pedestals 126 when the substrate assembly 120 is fixed to the base 134. Referring to FIG. 5, when the substrate 122 is fastened to the base plate 140, via threadable engagement between the fastener 163 and the receptacle 136, the substrate 122 applies a compressive force (e.g., a first compressive force) against the thermal interface material 128, as shown by a series of arrows. Likewise, because of the rigidity and strength of the base plate 140, the interface surface 129 of the pedestal 126 applies an opposite compressive force (e.g., a second compressive force) against the thermal interface material 128 to effectively clamp the thermal interface material 128 between the substrate 122 and the interface surface 129. Accordingly, the compressive force on the thermal interface material 128 is generated via the tightening of the substrate 122 to the base 134, independently of the cover 132, or any cover, of the electronic device 100. For example, the opposing compressive forces are applied to the thermal interface material 128 before the cover 132 is even attached to the base 134.

The height of the pedestal 126 is defined as the distance from the mounting surface 135 of the base plate 140 to the interface surface 129 of the pedestal 126. Furthermore, because the substrate 122 is fixed relative to the base plate 140, the position of the substrate 122 can also be defined as a distance away from the mounting surface 135, which is dependent on the height of the receptacle 136 relative to the mounting surface 135. Because the fasteners 163 clamp down on the substrate 122 at locations near an outer periphery of the substrate 122, and the substrate 122 engages the pedestals 126 at locations away from the outer periphery of, or more central on, the substrate 122 (e.g., via direct contact between the data processing components 124 and the thermal interface materials 128), the pedestal 126 can act as a fulcrum to cause the substrate 122 to bow or flex. Bowing or flexing of the substrate 122 can affect the quality and performance of the substrate assembly 120. For example, the solder connections 150 between the data processing components 124 and the substrate 122 can become damaged or broken when the substrate 122 is flexed or bowed. Moreover, bowing or flexing of the substrate 122 can cause the compressive forces acting on the thermal interface materials 128 to be uneven or non-uniform. In contrast, uniform compression of the thermal interface materials 128, within a desired compression ratio range (such as between 15% and 40% compressed), is desired to promote the most efficient heat transfer through the thermal interface materials 128, from the data processing components 124 to the pedestals 126.

In view of the foregoing, the properties of the interface surface 129 of the pedestal 126 are configured to help prevent bowing or flexing of the substrate 122 and prevent uneven or non-uniform compression of the thermal interface material 128. In some examples, the interface surface 129 is sloped, tilted, or angled with respect to the mounting surface 135 of the base 134. The slope, tilt, or angling of the interface surface 129 is facilitated by the interface surface 129 having two different heights, relative to the mounting surface 135. In other words, by definition, if the interface surface 129 has portions with two different heights, then the interface surface 129 is sloped, tilted, or angled.

Figure 6:
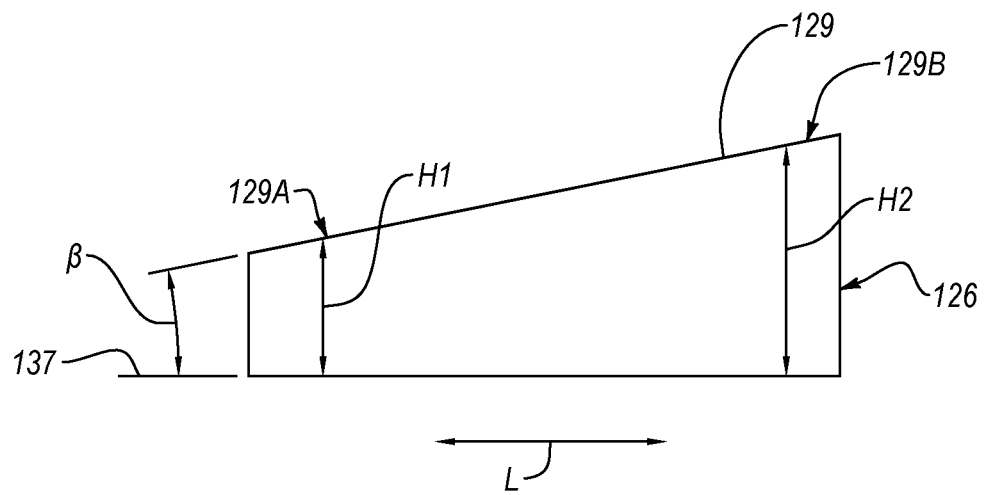
FIG. 6 is a side elevation, schematic view of a pedestal of the electronic device of FIG. 1, according to one or more examples of the present disclosure.
Figure 7:
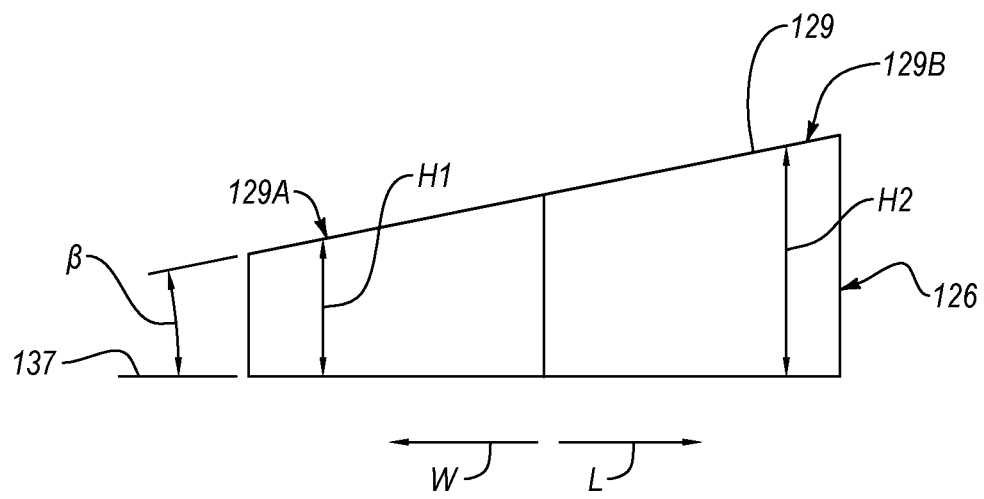
FIG. 7 is a diagonal elevation, schematic view of a pedestal of the electronic device of FIG. 1, according to one or more examples of the present disclosure.

Referring to FIG. 4, the interface surface 129 of the pedestal 126 includes a first portion 129A, which has a first height H1 relative to the mounting surface 135, and a second portion 129B, which has a second height H2 relative to the mounting surface 135 that is different than the first height H1. In some examples, the height of the pedestal is parallel to a height H of the electronic device 100 (see, e.g., FIG. 3). In the illustrated example, the first height H1 is less than the second height H2. Moreover, the first portion 129A is closer to the nearest fastener 163 than the second portion 129B. A third height H3 at a third portion 129C of the interface surface 129 can be less than the second height H2 and more than the first height H1. Accordingly, the interface surface 129 slopes downward toward the fastener 163 that is closest to the pedestal 126. However, depending on the configuration of the electronic device 100, in other examples, the first height H1 can be more than the second height H2, such that the interface surface 129 slopes downward toward the fastener 163 that is closest to the pedestal 126. Additionally, in yet other examples, depending on the configuration of the electronic device 100, the interface surface 129 may not slope upward or downward toward the fastener 163, but may slope in a direction that is not toward the fastener 163 closest to the pedestal 126. Referring to FIG. 4, in one example, at least a portion of the interface surface 129 is sloped in a direction parallel to a width W of the electronic device 100. Referring to FIG. 6, in another example, at least a portion of the interface surface 129 is sloped in a direction parallel to a length L of the electronic device 100, which is perpendicular to the width W of the electronic device 100. Referring to FIG. 7, in yet another example, at least a portion of the interface surface 129 is sloped in a direction angled with respect to both the width W and the length L of the electronic device 100.

The corresponding tilt, slope, or angle of the interface surface 129 can be defined by an angle β of the interface surface 129 relative to the mounting surface 135 (e.g., the plane 137 or a plane that is perpendicular to the central axis 143 of the receptacle 136). The angle β can define the angle of an entirety of the interface surface 129 relative to the mounting surface 135 (e.g., when an entirety of the interface surface 129 is at the same angle relative to the mounting surface 135 (see, e.g., FIGS. 3-7)), or each one of multiple portions of the interface surface 129 relative to the mounting surface 135 (e.g., when some portions of the interface surface are angled relative to other portions of the interface surface 129 (see, e.g., FIGS. 8-10)). In some examples, the angle β is between 0° and 30°, such as between 5° and 25°, between 10° and 20°, and the like.

Referring to FIGS. 3-7, in some examples, an entirety of the interface surface 129 of the pedestal 126 is planar. Accordingly, in such examples, all portions, including the first portion 129A and the second portion 129B, are co-planar and at the same angle β relative to the mounting surface 135.

Figure 8:
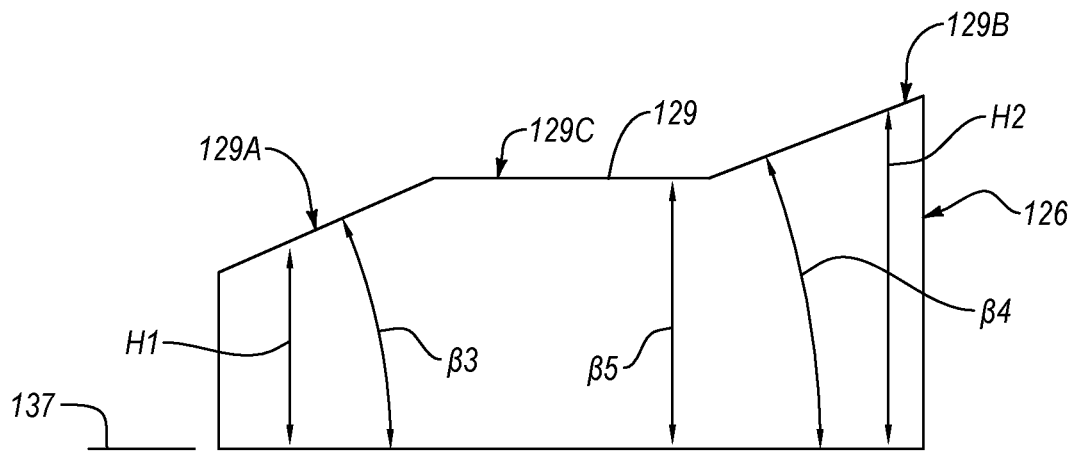
FIG. 8 is an elevation, schematic view of a pedestal of the electronic device of FIG. 1, according to one or more examples of the present disclosure.
Figure 9:
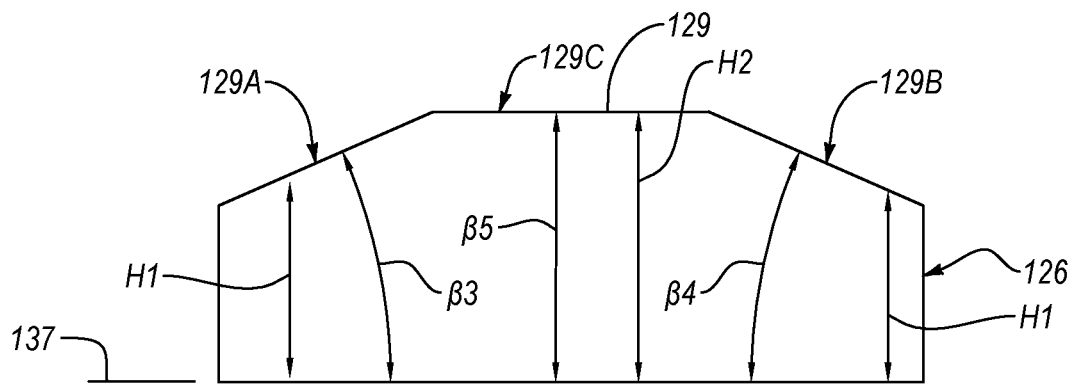
FIG. 9 is an elevation, schematic view of a pedestal of the electronic device of FIG. 1, according to one or more examples of the present disclosure.

However, as shown in FIGS. 8 and 9, in some examples, all portions of the interface surface 129 can be planar, but only some portions of the interface surface 129 are at the same angle β relative to the mounting surface 135. In the illustrated example, the first portion 129A is at a third angle β3 and the second portion 129B is at a fourth angle β4. In one example, the third angle β3 and the fourth angle β4 are the same. But, a third portion 129C, between the first portion 129A and the second portion 129B, is at a fifth angle β5 (e.g., 0°) that is different than the third angle β3 and the fourth angle β4.

In certain examples, the interface surface 129 has at least three portions at different angles. For example, the third angle β3, the fourth angle β4, and the fifth angle β5 can be different from each other.

Figure 10:
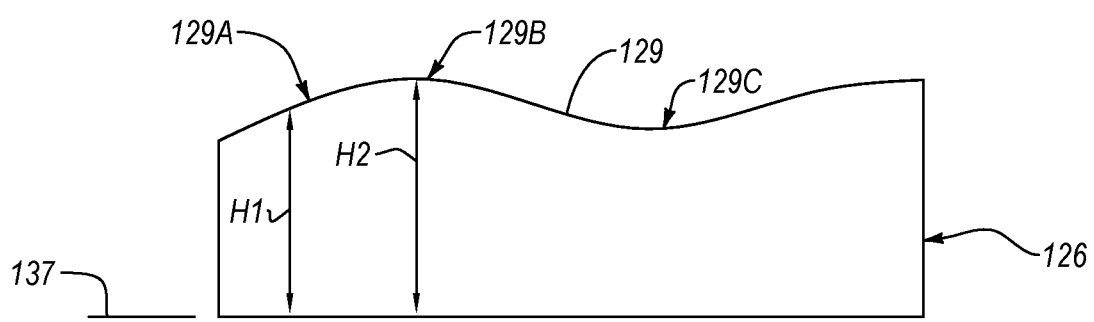
FIG. 10 is an elevation, schematic view of a pedestal of the electronic device of FIG. 1, according to one or more examples of the present disclosure.

Additionally, although in some examples, all angled portions of the interface surface 129 are angled in the same direction, such that all angled portions slope in the same direction, in certain examples, as shown in FIGS. 9 and 10, at least one portion of the interface surface 129 can slope in one direction while at least another portion of the interface surface 129 can slope in a different direction, such as in an opposite direction as shown.

Referring to FIG. 10, in some examples, at least one portion of the interface surface 129 is non-planar (e.g., contoured or curved). In the example of FIG. 10, the interface surface 129 has multiple curved portions, such that the interface surface 129 has at least one convex surface and at least one concave surface.

Referring to FIGS. 2 and 3, in some examples where the electronic device 100 has multiple data processing components 124, multiple pedestals 126, and multiple thermal interface materials 128, the characteristics of the interface surfaces 129 of the multiple pedestals 126 can be different from each other to accommodate different characteristics of the data processing components 124. For instance, in one example, the interface surface 129 of the first pedestal 126A has a maximum height and a minimum height, different from each other, and the interface surface 129 of the second pedestal 126B has a maximum height and a minimum height. At least one of the minimum heights or the maximum heights of the interface surfaces 129 of the first pedestal 126A and the second pedestal 126B is different. In some examples, both the minimum heights and the maximum heights of the interface surfaces 129 of the first pedestal 126A and the second pedestal 126B are different. Similarly, in one example, where an entirety of the interface surface 129 of the first pedestal 126A is at a first angle β1, relative to the mounting surface 135, and an entirety of the interface surface 129 of the second pedestal 126B is at a second angle β2, relative to the mounting surface 135, the first angle β1 is different than second angle β2. Alternatively, in some examples, the interface surface 129 of the first pedestal 126A has multiple portions with a particular angular configuration relative to each other and the interface surface 129 of the second pedestal 126B has multiple portions with a particular angular configuration that is different than that of the interface surface 129 of the first pedestal 126A.

Figure 11:
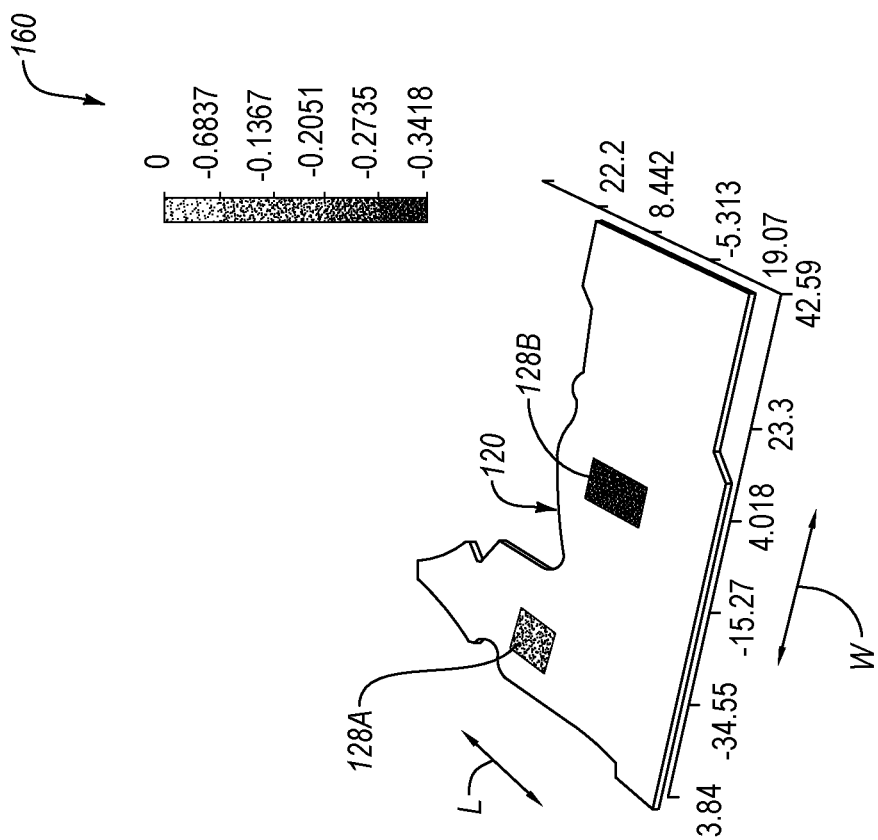
FIG. 11 is a graphical report of compressive forces acting on thermal interface materials, when interfaced with a first example of a pedestal of an electronic device, according to one or more examples of the present disclosure.
Figure 12:
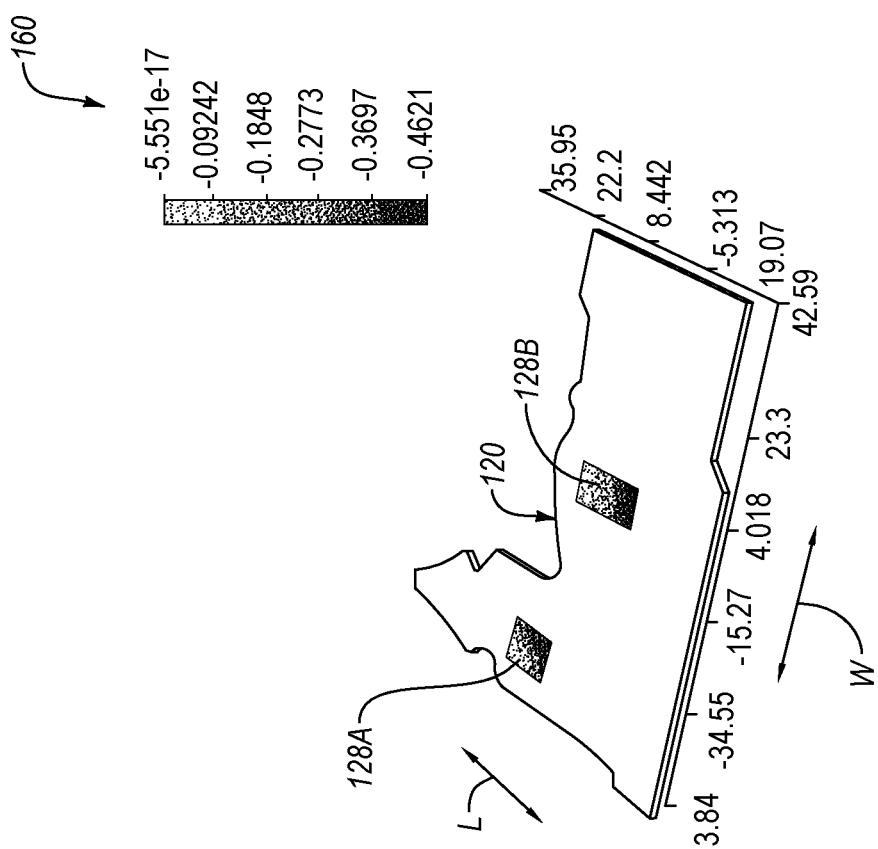
FIG. 12 is a graphical report of compressive forces acting on thermal interface materials, when interfaced with a second example of a pedestal of an electronic device, according to one or more examples of the present disclosure.
Figure 13:
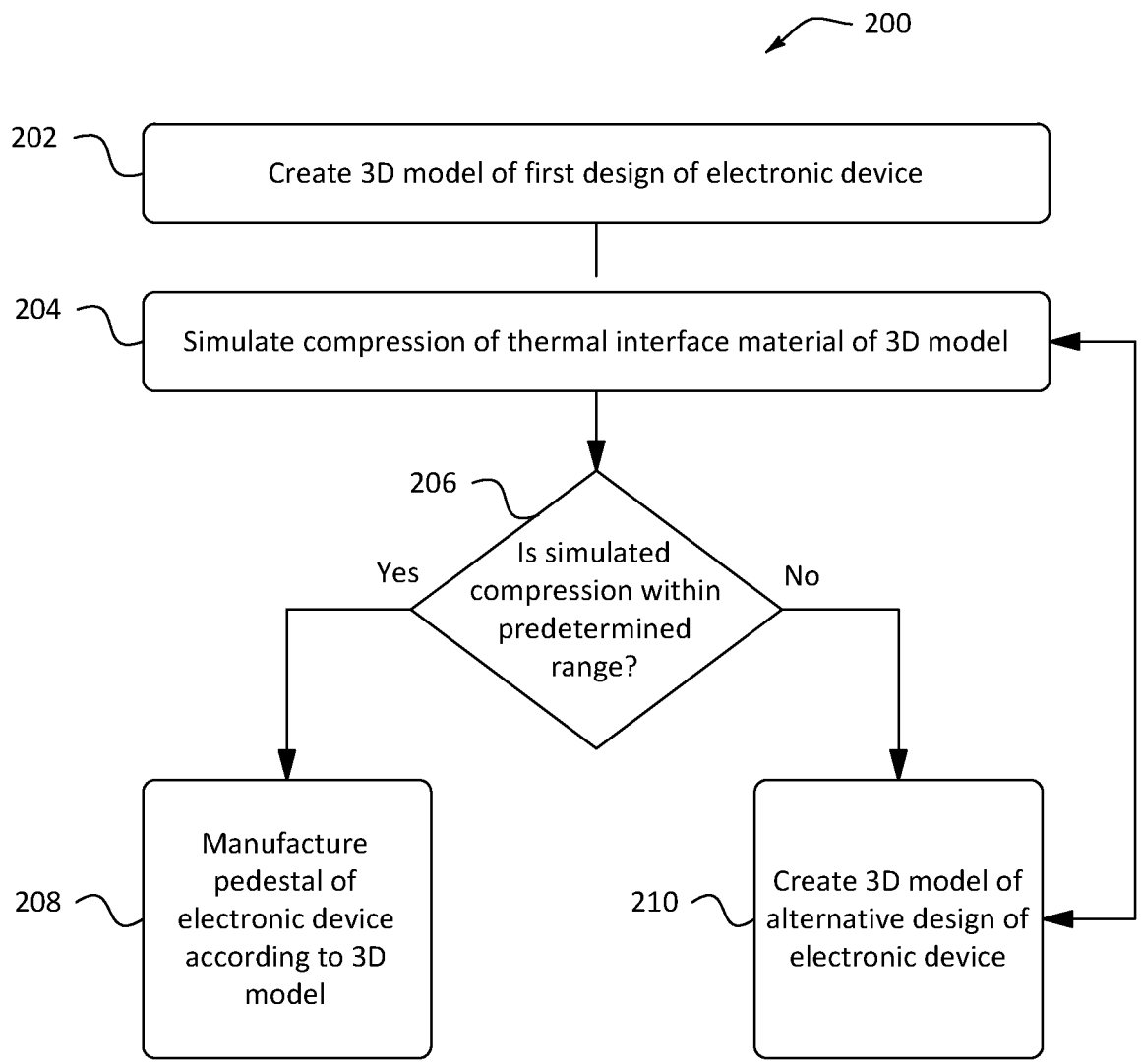
FIG. 13 is a schematic flow chart of a method of making an electronic device, according to one or more examples of the present disclosure.

Referring to FIGS. 11-13, according to some examples, a method 200 of making the electronic device 100 is shown. The method 200 is helpful to make an electronic device 100 where an average compression ratio of the thermal interface material 128 between the data processing component 124 and the interface surface 129 of the pedestal 126 falls within a predetermined range associated with an efficient heat-transfer performance of the thermal interface material 128. As used herein, the compression ratio of the thermal interface material 128 is a ratio of the thickness of the thermal interface material 128 after compression to the thickness of the thermal interface material 128 before compression. As mentioned above, in some examples, the predetermined range of the average compression ratio can be from 0.15 to 0.40. In other example, the predetermined range of the average compression ratio can be from 0.20 to 0.35. In yet other examples, the predetermined range of the average compression ratio can be from 0.25 to 0.30. The average compression ratio can be determined by measuring, manually or via simulation, the thickness of the thermal interface material 128 at multiple locations on the interface surface 129, and taking an average (e.g., arithmetic mean, median, mode, or mid-range) of the thickness measurements. Alternatively, for the sake of simplicity, the average compression ratio can be the compression ratio at a geometrical middle point of the thermal interface material 128 and the interface surface 129 of the pedestal 126 can be considered to be a single sloping surface.

According to one example, the method 200 is practiced manually by making the base 134 with the interface surface 129 of the pedestal 126 having a first configuration, manually taking thickness measurements of the thermal interface material 128 before and after compressing the thermal interface material 128, and making a new base 134 with an interface surface 129 of the pedestal 126 that has a different configuration in response to whether an average compression ratio and/or compression ratio uniformity of the thermal interface material 128 falls within the predetermined range.

Although such a manual method is achievable, to promote efficiency and cost-reduction, the method 200 can utilize a computer-aided simulation to predict the average compression ratio of a model of the thermal interface material 128 and adjust a design of the pedestal accordingly, prior to making the electronic device 100. For example, referring to FIG. 13, according to one example, the method 200 includes (block 202) creating a digital three-dimensional (3D) model of a first design of the electronic device 100. In the first design of the electronic device 100, the first portion 129A of the interface surface 129 of the pedestal 126 has a first height H1, relative to the mounting surface 135, and the second portion 129B of the interface surface 129 of the pedestal 126 has a second height H2, relative to the mounting surface 135. The second height H2 is different than the first height H1. Accordingly, the interface surface 129 is tilted, angled, or sloped, in at least one direction. Alternatively, in certain examples, to provide baseline conditions, the first design of the electronic device 100 may have a non-angled interface surface 129.

The method 200 additionally includes (block 204) simulating compression of the thermal interface material 128 of the 3D model of the first design of the electronic device 100.

Simulation of the compression of the thermal interface material 128 of the 3D model can be achieved using any of various finite element analysis software or computer aided design software. As used herein, simulating the compression of the thermal interface material 128 can include determining an average compression ratio and/or a uniformity of the compression ratio of the model of the thermal interface material 128. Referring to FIG. 11, a graphic report or representation of the results of a simulation of the compression of a first thermal interface material 128A and a second thermal interface material 128B, overlayed onto a substrate assembly 120, of a first design of a 3D model of the electronic device 100 is shown. In the graphical report of FIG. 11, the compression ratio of the first thermal interface material 128A steadily decreases in a direction angled relative to a width W and a length L of the electronic device 100. In contrast, the compression ratio of the second interface material 128B steadily decreases in a direction parallel to the length L of the electronic device 100. In some examples, the first design of the 3D model represented in FIG. 11 has a pedestal with an interface surface 129 that is planar, but not angled relative to the mounting surface 135.

The method 200 further includes (block 206) determining if the simulated compression is within a predetermined range, which can one or both of an average compression ratio predetermined range and a compression ratio uniformity predetermined range. If the simulated compression is within the predetermined range, then the method 200 proceeds to (block 208) and manufactures the electronic device 100 according to the first design of the 3D model such that the interface surface 129 of the pedestal 126 has the height and tilt configuration of the first design. However, if the simulated compression is not within the predetermined range, then the method 200 proceeds to (block 210) create a second design of the 3D model where the interface surface 129 of the pedestal 126 has a height and tile configuration that is different than the first design of the 3D model. The height and tile configuration of the second design is based on the simulated compression results from the simulation of the first design of the 3D model. In other words, the second design of the 3D model includes an interface surface 129 of the pedestal 126 that has a height and tilt configuration that is designed to correct the compression deficiencies exhibited with the first design of the 3D model. For example, one or more heights of the interface surface 129 can be changed to change a tilt of the interface surface 129 and provide a more uniform compression of the thermal interface material 128.

In some examples, the adjustments to the design of the 3D model can include application of the following equation $$\delta = t(\varepsilon_{spec} - \varepsilon_{result}) \quad (1)$$

where t is the starting or baseline thickness of the thermal interface material 128, $\varepsilon_{spec}$ is a desired compression ratio, $\varepsilon_{result}$ is the measured or simulated compression ratio, and $\delta$ is the adjustment to the height of the interface surface 129.

After the new design of the 3D model is created, the method 200 returns to block 204 and simulates the compression of the thermal interface material 128 to see if the simulated compression of the thermal interface material 128 of the new or second design of the 3D model falls within the predetermined range at block 206. If so, then at block 208, the method 200 manufactures the electronic device 100 according to the second design of the 3D model such that the interface surface 129 of the pedestal 126 has the height and tilt configuration of the second design. The method 200 iteratively executes blocks 204, 206, and 210 until a design that meets the simulated compression predetermined ranges is found, at which time an electronic device 100 having the design is manufactured.

Referring to FIG. 11, a graphic report or representation of the results of a simulation of the compression of the first thermal interface material 128A and the second thermal interface material 128B, overlayed onto the substrate assembly 120, of the first design of the 3D model of the electronic device 100 is shown. In the graphical report of FIG. 12, the compression ratio of the first thermal interface material 128A steadily decreases in a direction angled relative to a width W and a length L of the electronic device 100, and exhibits better compression, but still fall outside the predetermined range, thus requiring a redesign of the interface surface 129 of the first pedestal 126A of the second design. In contrast, the compression ratio of the second interface material 128B only slightly decreases in a direction parallel to the width W of the electronic device 100 and falls within the predetermined range across the second thermal interface material 128B, such that no redesign of the interface surface 129 of the second pedestal 126B.

In the above description, certain terms may be used such as "up," "down," "upper," "lower," "horizontal," "vertical," "left," "right," "over," "under" and the like. These terms are used, where applicable, to provide some clarity of description when dealing with relative relationships. But these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. Examples of the scope of the present subject matter can be found in the following claims.

What is claimed is:

1. An electronic device, comprising:
   a base, comprising a mounting surface;
   a substrate, fixed to the base;
   a data processing component, attached to the substrate;
   a pedestal, extending from the mounting surface of the base, interposed between the base and the data processing component, and comprising an interface surface having a first portion and a second portion; and
   a thermal interface material, comprising a thermal-interface surface having a first portion and a second portion, interposed between the interface surface of the pedestal and the data processing component, in direct contact with the data processing component along the thermal-interface surface, and in direct contact with the first portion and the second portion of the interface surface of the pedestal,
   wherein:
     the first portion of the interface surface of the pedestal has a first height, relative to the mounting surface of the base;
     the second portion of the interface surface of the pedestal has a second height, relative to the mounting surface of the base and different than the first height;
     the first portion of the thermal-interface surface has a first thermal-interface height, relative to the mounting surface of the base; and
     the second portion of the thermal interface surface has a second thermal-interface height, relative to the mounting surface of the base and different from the first thermal-interface height.

2. The electronic device according to claim 1, wherein the interface surface is planar, such that the first portion and the second portion of the interface surface are co-planar.

3. The electronic device according to claim 1, wherein at least one of the first portion or the second portion of the interface surface is angled relative to the mounting surface.

4. The electronic device according to claim 1, wherein:
   the thermal interface material is in direct contact with the interface surface over an entirety of the interface surface of the pedestal; and
   the entirety of the interface surface of the pedestal is angled relative to the mounting surface.

5. The electronic device according to claim 1, wherein the substrate is fixed to the base such that the data processing component imparts a first compressive force on the thermal interface material and the interface surface imparts a second compressive force on the thermal interface material.

6. The electronic device according to claim 1, wherein the thermal interface material is a sheet thermal interface material.

7. The electronic device according to claim 1, further comprising a cover coupled with the base, such that the substrate is interposed between the cover and the pedestal.

8. The electronic device according to claim 7, wherein the substrate is fixed to the base such that, independent of the cover, the data processing component imparts a first compressive force on the thermal interface material and the interface surface of the pedestal imparts a second compressive force on the thermal interface material.

9. The electronic device according to claim 1, further comprising a fastener, passing through the substrate and engaged with the base such that the substrate is fastened directly to the base.

10. The electronic device according to claim 1, further comprising a cover coupled with the base.

11. The electronic device according to claim 10, wherein the pedestal and the base together form a one-piece monolithic construction.

12. The electronic device according to claim 1, wherein the substrate is in direct contact with the base.

13. The electronic device according to claim 1, further comprising:
   a second data processing component, attached to the substrate;
   a second pedestal, extending from the mounting surface of the base, interposed between the base and the second data processing component, and comprising a second-pedestal interface surface having a second-pedestal first portion and a second-pedestal second portion; and a second thermal interface material, interposed between the second-pedestal interface surface and the second data processing component, in direct contact with the second data processing component, and in direct contact with the second-pedestal first portion and the second-pedestal second portion of the second-pedestal interface surface, wherein:
the second-pedestal first portion of the second-pedestal interface surface has a second-pedestal first height, relative to the mounting surface of the base, and the second-pedestal second portion of the second-pedestal interface surface has a second-pedestal second height, relative to the mounting surface of the base and different than the second-pedestal first height;
the first height of the first portion of the interface surface is a minimum height of the interface surface;
the second height of the second portion of the interface surface is a maximum height of the interface surface;
the second-pedestal first height is a minimum height of the second-pedestal interface surface;
the second-pedestal second height is a maximum height of the second-pedestal interface surface; and
at least one of:
the first height of the interface surface is different than the second-pedestal first height; or
the second height of the interface surface is different than the second-pedestal second height.

14. The electronic device according to claim 1, further comprising:
a second data processing component, attached to the substrate;
a second pedestal, extending from the mounting surface of the base, interposed between the base and the second data processing component, and comprising a second-pedestal interface surface having a second-pedestal first portion and a second-pedestal second portion; and
a second thermal interface material, interposed between the second-pedestal interface surface and the second data processing component, in direct contact with the second data processing component, and in direct contact with the second-pedestal first portion and the second-pedestal second portion of the second-pedestal interface surface,
wherein:
the second-pedestal first portion of the second-pedestal interface surface has a second-pedestal first height, relative to the mounting surface of the base, and the second-pedestal second portion of the second-pedestal interface surface has a second-pedestal second height, relative to the mounting surface of the base and different than the second-pedestal first height;
the thermal interface material is in direct contact with the interface surface over an entirety of the interface surface of the pedestal;
the second thermal interface material is in direct contact with the second-pedestal interface surface over an entirety of the second-pedestal interface surface;
the entirety of the interface surface of the pedestal is angled, at a first angle, relative to the mounting surface;
the entirety of the second-pedestal interface surface of the second pedestal is angled, at a second angle, relative to the mounting surface; and
the first angle is different than the second angle.

15. The electronic device according to claim 1,
wherein the thermal interface material is in direct contact with an entirety of the interface surface of the pedestal such that no empty space exists between the data processing component and the pedestal.

16. A data storage device, comprising:
an enclosure, comprising a base having a mounting surface, a cover coupled to the base, and an interior cavity defined between the base and the cover;
a substrate, fixed to the base within the interior cavity;
a data processing component, attached to the substrate;
a data storage component, within the interior cavity and unattached to the substrate;
a pedestal, extending from the mounting surface of the base, interposed between the base and the data processing component, and comprising an interface surface having a first portion and a second portion; and
a thermal interface material, comprising a thermal-interface surface having a first portion and a second portion, interposed between the interface surface of the pedestal and the data processing component, in direct contact with the data processing component along the thermal-interface surface, and in direct contact with the first portion and the second portion of the interface surface of the pedestal,
wherein:
the first portion of the interface surface of the pedestal has a first height, relative to the mounting surface of the base;
the second portion of the interface surface of the pedestal has a second height, relative to the mounting surface of the base and different than the first height;
the first portion of the thermal-interface surface has a first thermal-interface height, relative to the mounting surface of the base; and
the second portion of the thermal-interface surface has a second thermal-interface height, relative to the mounting surface of the base and different from the first thermal-interface height.

17. The data storage device according to claim 16, wherein:
the substrate comprises a printed circuit board; and
the data processing component comprises a semiconductor integrated circuit attached to the printed circuit board by a plurality of solder connections.

18. The data storage device according to claim 16, wherein the data storage component comprises a magnetic storage disk.

19. The data storage device according to claim 16, wherein:
the base further comprises a receptacle extending from the mounting surface;
the substrate comprises an opening;
the data storage device further comprises a fastener, passing through the opening of the substrate and engaged with the receptacle of the base, such that the substrate is fastened directly to the base; and
engagement between the fastener and the receptacle of the base generates a first compressive force from the data processing component to the thermal interface material and a second compressive force from the interface surface of the pedestal to the thermal interface material.

20. The data storage device according to claim 19, wherein:
the receptacle defines a central axis;
the fastener is coaxial with the central axis; and the interface surface of the pedestal is oblique relative to central axis of the receptacle.

* * * * *